J. B. HORNE.
SHOCK ABSORBER.
APPLICATION FILED JULY 13, 1914.
1,309,850.
Patented July 15, 1919.
3 SHEETS—SHEET 2.
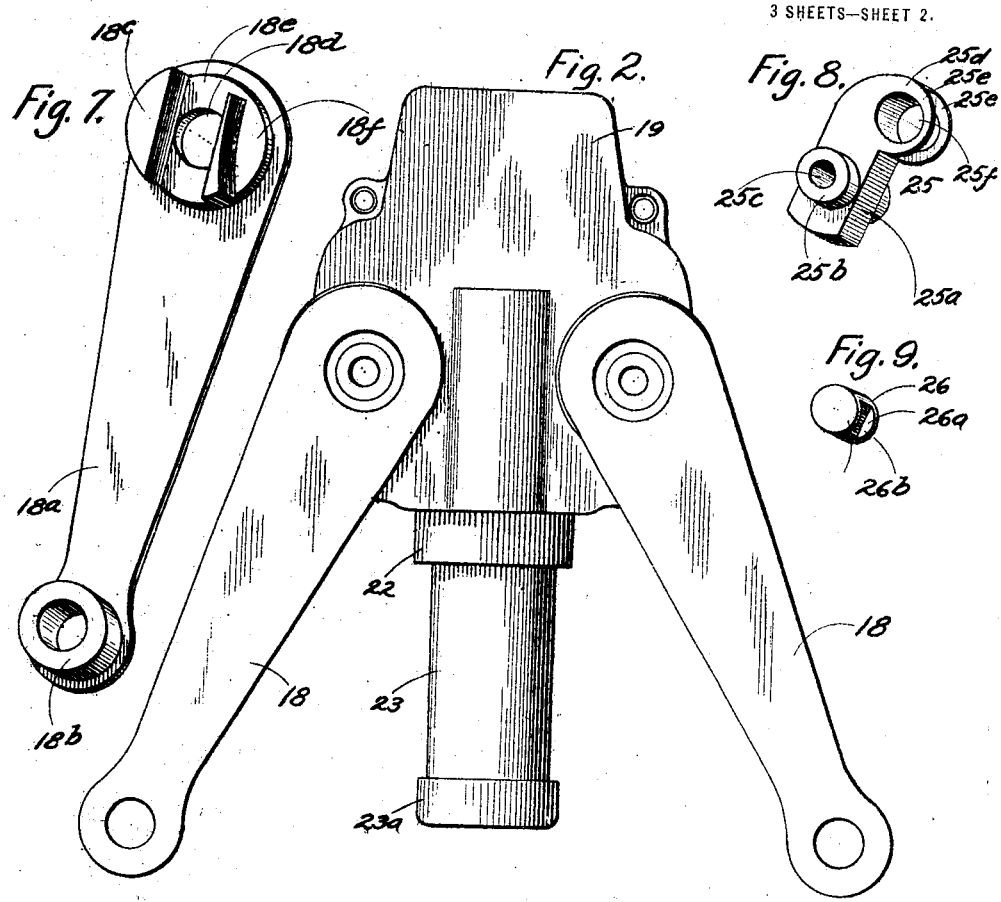
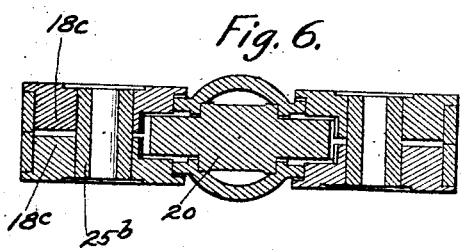

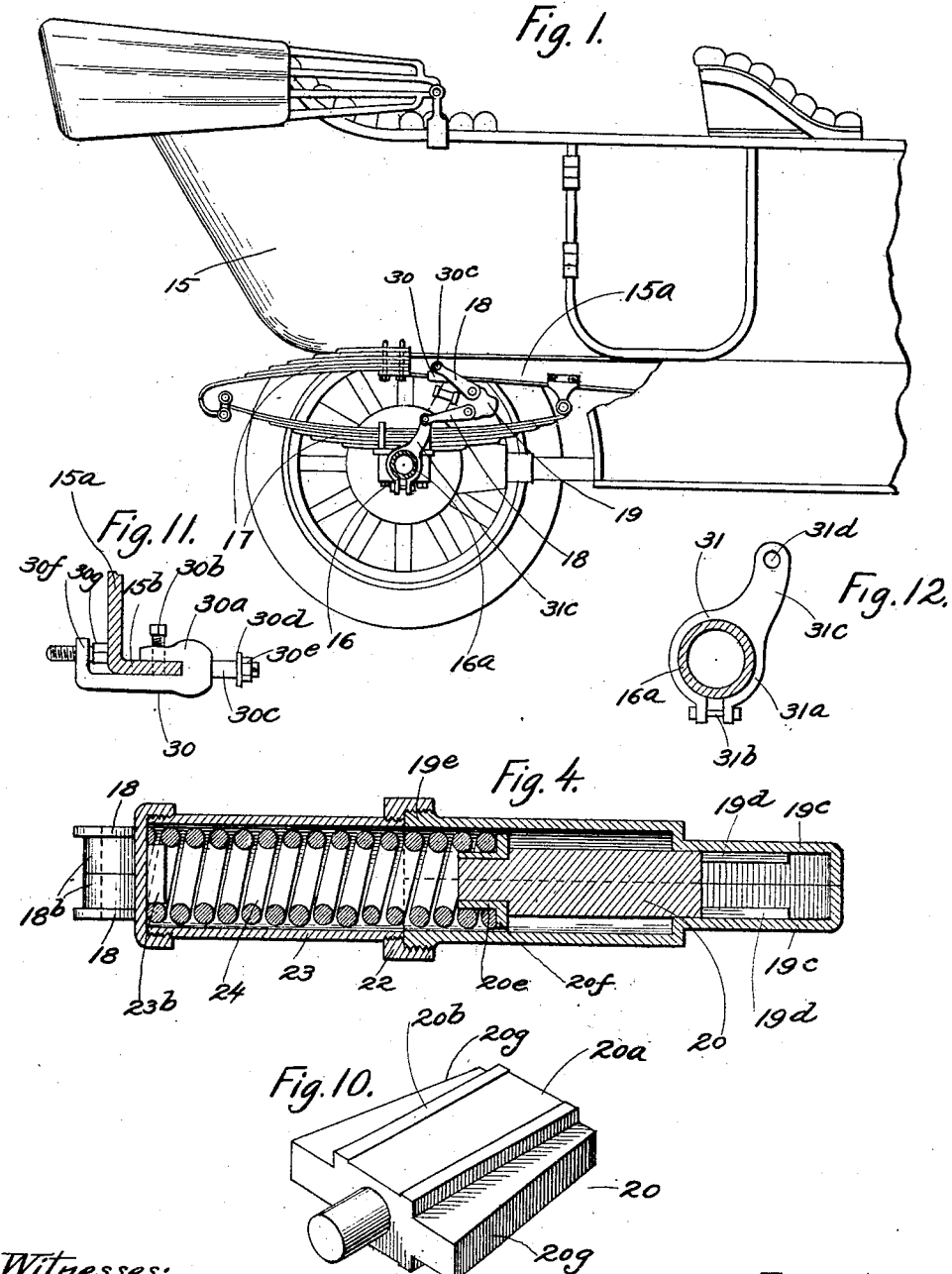

J. B. HORNE.
SHOCK ABSORBER.
APPLICATION FILED JULY 13, 1914.
1,309,850.
Patented July 15, 1919.
3 SHEETS—SHEET 3.
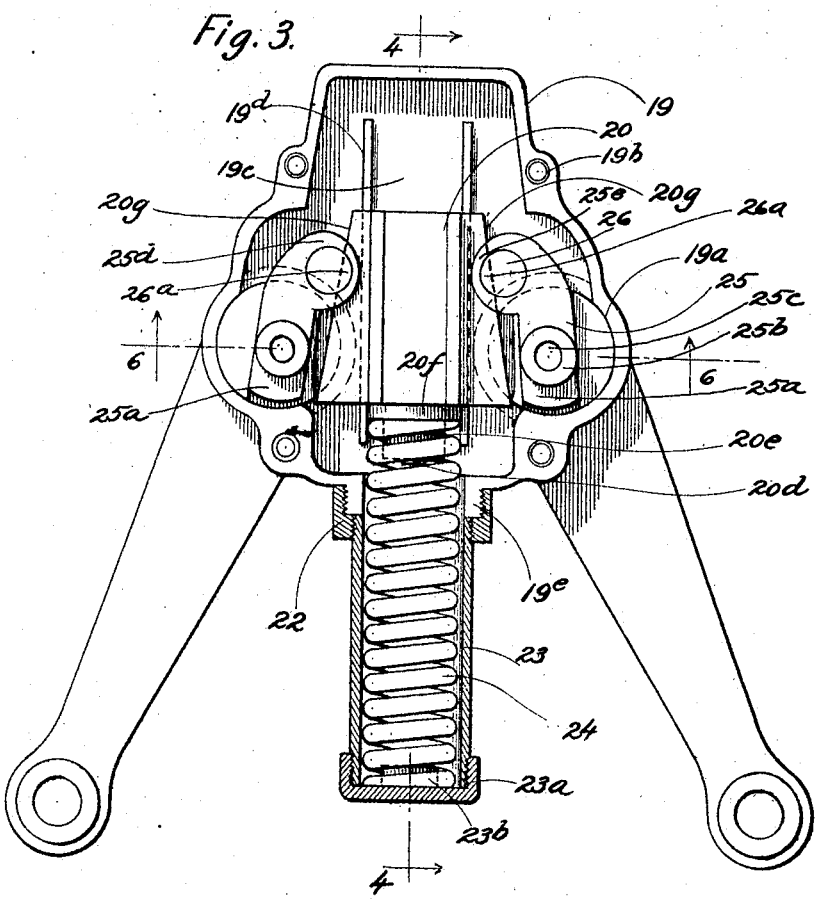
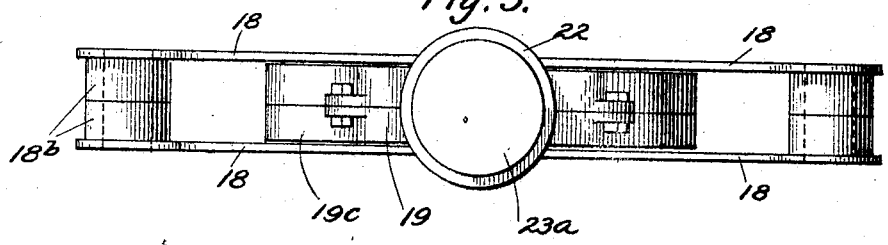

UNITED STATES PATENT OFFICE.

JAMES B. HORNE, OF ST. CHARLES, ILLINOIS.

SHOCK-ABSORBER.

1,309,850.　　　　Specification of Letters Patent.　　Patented July 15, 1919.

Application filed July 13, 1914. Serial No. 850,696.

*To all whom it may concern:*

Be it known that I, JAMES B. HORNE, a citizen of the United States, residing at St. Charles, in the county of Kane and State of Illinois, have invented certain new and useful Improvements in Shock-Absorbers, of which the following is a specification.

This invention relates to improvements in shock absorbers, and has for its object to provide a device especially adapted for use with a vehicle such as an automobile to minimize or eliminate the shock due to the same passing over a bump or encountering an obstacle. These devices are ordinarily used to supplement the usual vehicle springs, and it is well known to those skilled in this art that the unpleasant shock, due to rough roads, stones or the like, is caused principally by the rebound of the vehicle, due to the action of the ordinary springs. My device is constructed to permit these springs to operate in the usual manner when a bump is encountered, the body of the vehicle and the axles being permitted to approach each other in the usual manner, this movement being resisted by the vehicle springs. When the rebound or return to and beyond normal position of the body and axles takes place, my device interposes the resistance which eliminates the vibration or up or down movement of the vehicle body.

I have provided further a new and improved means for attaching my shock absorber to a vehicle or the like.

These and other objects are attained by the structure set forth and described in the following specification and shown in the accompanying drawings, in which:

Figure 1 is a side elevation of a portion of a vehicle, a rear wheel and mud guard being removed to show the attachment of my device when used, for example, with a three-quarter elliptic spring;

Fig. 2 is a plan view of my device;

Fig. 3 is a horizontal section of the same;

Fig. 4 is a vertical longitudinal section along the line 4—4 of Fig. 3;

Fig. 5 is an end view of my device;

Fig. 6 is a transverse section along the line 6—6 of Fig. 3;

Fig. 7 is a perspective of one of the components of an arm;

Fig. 8 is a perspective of one of the levers;

Fig. 9 is a similar perspective of a contact block;

Fig. 10 is a perspective of the sliding block or plate;

Fig. 11 is a detail of one of the fastening members showing its attachment to a vehicle frame, and Fig. 12 is a side elevation of another one of the attaching members.

Like numerals refer to like elements throughout the drawings, in which 15 designates generally the body of an automobile mounted above a rear axle 16, the three-quarter elliptic spring 17 being interposed therebetween. The body 15 is secured to frame member 15$^a$, as shown in Fig. 1. The shock absorber proper, as I term it, comprises a pair of normally diverging arms 18, each of these arms being constructed of a pair of component arms 18$^a$, each pair, when assembled, forming a complete arm 18. Each of the components 18$^a$ is provided with the perforated collar or shoulder 18$^b$ at one end thereof and a boss 18$^c$ adjacent the other end. The latter is preferably circular in contour and is centrally apertured, as indicated by numeral 18$^d$. A slot 18$^e$ is provided in the upper portion of the bosses 18$^c$, a groove or recess 18$^f$ is formed also in the upper portion at one side of each of said bosses 18$^c$, for a purpose to be hereinafter described. The bosses 18$^c$ and collars 18$^b$ of each pair of components 18$^a$ are in contact, when assembled, and thereby maintain the body of the component members 18$^a$ separated throughout substantially their entire length when the arms 18 are assembled. The bosses 18$^c$ are journaled in the circular apertures 19$^a$ of the casing members 19, these casing members being adapted to be placed together and attached by screws or the like through the threaded apertures 19$^b$ to provide a single casing when the entire device is assembled. Each of these casing members 19 is provided with the side flange or wall 19$^c$ and with internally located parallel ribs or guides 19$^d$ forming a guide-way when the device is assembled. A slidable block or plate member 20 is provided, this block being constructed with the raised portions 20$^a$ adapted to slide in the guide-way formed by guides or ribs 19$^d$, as shown in Fig. 3, for example. These raised portions 20 may be provided with the upwardly projecting ribs or shoulders 20$^b$ to contact with the inner surface of the casing members 19, thereby reducing friction, although I do not consider this necessary in all cases. At one end the casing members 19 are provided with the semi-circular flanges 19$^e$ forming, when assembled, a circular and apertured collar, externally threaded. An internally threaded ring or collar 22 is threaded on this collar 19$^e$ to assist in maintaining the halves of the casing in assembled position. A barrel or tube 23 is threaded into a portion of the collar 22 and in turn is provided with a cap 23$^a$, said cap being threaded thereon. A stud 23$^b$ projects inwardly from cap 23$^a$, the latter furnishing a seat for a coiled spring 24. A stud or boss 20$^d$ extends from one end of the block 20 and a collar 20$^e$ is mounted thereon, the latter being provided with a base flange 20$^f$ against which the other end of the spring 24 contacts when in the position shown, for example, in Fig. 3. The block 20 is constructed with a trapezoidal contour having the inclined side walls 20$^g$, as clearly shown in Fig. 10, for example. I further provide what I term levers 25, each of these levers being provided with a rectangular portion 25$^a$, see Fig. 8, closely fitting in slots 18$^e$ of bosses 18$^e$ on arms 18. These levers 25 also have the bosses 25$^b$ projecting outwardly from each side of the rectangular portion 25$^a$ and fitting in the apertures 18$^d$ of component arm members 18$^a$, these bosses and the rectangular portion 25$^a$ being provided with a through extending bore or aperture 25$^c$. At one end the levers 25 are provided with the head or enlarged portion 25$^d$ slotted, as indicated at 25$^e$, to provide side flanges. A circular aperture 25$^f$ is provided in each of the side flanges 25$^e$. In these apertures 25$^f$ are mounted the contact blocks 26, as I term them, the same being cylindrical in shape provided with the slots 26$^a$ forming side flanges 26$^b$. The relation and arrangement of these levers 25 is such that when assembled, the side flanges 25$^e$ of contact blocks 26 will fit over the side walls of the block 20, the flattened portion of the contact blocks 26 being adapted to ride on the side walls, the cylindrical shape of said blocks being such as to permit its rotation relative to the levers 25, for a purpose to be hereinafter described.

It will be apparent that when the device is assembled, should the ends of the arms 18 be brought together from position shown in Figs. 2 and 3, they will pivot about their mounting in circular apertures 19$^a$ causing the levers 25 to partially rotate about a common center with them. This will tend to remove the contact blocks 26 from contact with the plate 20, but the action of the coiled spring 24 is such as to maintain the plate or block 20 in constant engagement with the contact blocks 26 when such movement occurs. When a reverse or spreading movement of the arms 18 takes place, it will be apparent that the contact blocks 26 will be forced against the side walls of the plate or block 20, through the medium of the levers 25. The inclination of the sides of block 20 is such that only a certain portion of the force exerted thereon will be resolved along the longitudinal axis of the block 20, as will be apparent, and a great resistance is afforded to such spreading movement of the arms 18. At the same time the block 20 being symmetrically constructed, no binding thereof with respect to the casing will take place, as will also be apparent. Those skilled in the art will understand that by varying the inclination of the sides of the block 20 relative to the longitudinal axis, the amount of resistance afforded by the block 20 to the spreading movement of the arms may be varied; also the resistance of the spring 24 to movement of the block 20, such as to compress it, will increase the resistance afforded to the spreading movement of the arms. It will be apparent, therefore, that I have provided a construction which will permit free movement of the arms 18 toward each other, but will greatly resist the spreading movement of such arms, the amount of this resistance being capable of variation according to the inclination of the sides of the block 20 and the strength of the spring 24. In applying my device to a vehicle, such as that shown in Fig. 1, for example, I arrange the absorber between the body and the axle of the vehicle so that movement of the former toward the latter will not be effected, save by the action of the usual vehicle springs 17. When the body tends to move away from the axle in reaction to the above described movement, however, the resisting effect of the absorber is felt and there is no tendency of the vehicle to vibrate or move up and down beyond the normal or rest position thereof. In attaching my improvement to a vehicle I provide the attaching member 30 comprising a head 30$^a$ adapted to fit over one flange 15$^b$ of channel frame member 15$^a$ being retained in position by the set screw 30$^b$. A stud 30$^c$ projects outwardly from the head 30$^a$ and is provided with a washer 30$^d$ and nut 30$^e$. The apertured end of one of the arms 18 may be mounted upon this stud 30$^c$, as is shown in Fig. 1, for example. To further insure the retention of the fastening member 30 in position, I bend the other end 30$^f$ thereof upwardly and insert a set screw 30$^g$ therethrough with the head bearing against the web of the channel 15$^a$, as is clearly shown in Fig. 11. The operation of attaching and screwing this fastening member in place is believed to be obvious to those skilled in the art. For the other arm 18 of the shock absorber, I provide an attaching member 31 having the split ring portion 31$^a$ adapted to fit around the axle casing 16$^a$, being clamped thereto by the bolt and nut 31ᵇ. An arm 31ᶜ projects upwardly therefrom and is apertured at 31ᵈ to permit attachment of the end of one of the arms 18, as shown in Fig. 1. I have shown the ends of the two arms 18 as relatively offset with respect to the vertical in the attachment shown in Fig. 1, this offsetting arrangement being advantageous in certain instances to minimize the initial shock or stress applied to the plate or block 20 when first encountering a bump or the like.

It is obvious that modifications are necessary in attaching my device to various constructions of vehicles or the like and that springs of different tension may be utilized and also that the inclination of the sides of the block may be varied to vary the resistance afforded by my device.

It will also be apparent that many other modifications and changes are possible, and I do not wish to be restricted to the form shown and described beyond the scope of the appended claims.

What I claim is:—

1. In a device of the class described, arms, a movable block provided with inclined sides, said arms being provided with means coacting and contacting with said sides of said block in such wise that the latter will resist movement of said arms in one direction, and means to normally return said block to normal position, said means comprising a spring member.

2. In a device of the class described, a pair of arms, a movable block, and means to guide said block, said block being provided with inclined surfaces, said arms being provided with detachable elements adapted to contact with said surfaces in such wise that said block will be moved by and resist the movement of said arms.

3. In a device of the class described, a pair of movable arms, a block slidably mounted between said arms, means to guide said block, said block being provided with inclined surfaces, said arms being provided with means contacting with said surfaces whereby said block will be moved by and resist the movement of said arms, and a spring member adapted to resist movement in one direction of said block, said means being also arranged to normally return said block to normal position.

4. In a device of the class described, arms, a movable block, detachable levers carried by said arms and coacting with said block whereby proper movement of said arms will cause said levers to move said block, said movement of the latter operating to resist said movement of said arms.

5. In a device of the class described, a casing, arms pivotally journaled in said casing, a movable block reciprocably mounted in said casing, and detachable levers carried by said arms and contacting with said block in such wise that proper movement of said arms will move said block, such movement operating to resist the movement of said arms.

6. In a device of the class described, a casing, arms pivotally journaled in said casing, a movable block reciprocably mounted in said casing, levers carried by said arms and contacting with said block in such wise that proper movement of said arms will move said block, such movement operating to resist the movement of said arms, and means operating independently of said arms to normally return said block to normal position after such first named movement.

7. In a device of the class described, a casing, arms pivotally journaled in said casing, a movable block reciprocably mounted in said casing, levers carried by said arms and contacting with said block in such wise that proper movement of said arms will move said block, such movement operating to resist the movement of said arms, and means to normally return said block to normal position after such first named movement, said last named means comprising a spring member carried by said casing.

8. In a device of the class described, arms, said arms being provided with slotted bosses, levers mounted in said bosses to move with said arms, a movable block, said levers contacting with said block and adapted to move the same bodily upon proper movement of said arms, said block being arranged to resist such movement of said arms.

9. In a device of the class described, a casing, arms pivotally mounted in said casing and provided with bosses, said bosses being slotted, levers mounted in said slots to move with said arms, a block movably mounted in said casing, said block being provided with inclined surfaces, said levers being in contact with said surfaces whereby proper movement of said arms will move said block, such movement being operative to resist said movement of said arms.

10. In a device of the class described, a casing having guide-ways therein, a block slidably mounted in said guides, said block being provided with inclined sides, arms pivotally mounted in said casing, and levers carried by said arms and contacting with said inclined sides of said block whereby proper movement of said arms will operate to move said block bodily in said guides, said block being arranged to resist such movement of said arms.

11. In a device of the class described, a casing, a block slidably mounted in said casing and provided with inclined sides, a pair of arms pivotally mounted in said casing, each of said arms comprising a pair of component members provided with bosses, said bosses being slotted, levers mounted in said slots, and a contact block carried by said levers and contacting with said inclined sides of said block.

12. In a device of the class described, a movable block, arms, said arms being provided with slotted bosses, and levers mounted in said bosses to move with said arms, each of said levers being provided with a contact block rotatably journaled therein, said blocks being in contact with said first named block.

13. In a shock absorber, a movable block having a plurality of inclined surfaces, and a plurality of levers, one mounted on each side of said block and each terminating at one end adjacent one of said inclined surfaces of said block and in contact therewith, whereby said block will be moved by and resist the movement of said levers.

In testimony whereof, I have subscribed my name.

JAMES B. HORNE.

Witnesses:
E. F. GOODELL,
C. JAY MAROM.

Correction in Letters Patent No. 1,309,850.

It is hereby certified that in Letters Patent No. 1,309,850, granted July 15, 1919, upon the application of James B. Horne, of St. Charles, Illinois, for an improvement in "Shock-Absorbers," an error appears in the printed specification requiring correction as follows: Page 3, after line 88, claim 7, insert the words *operating independently of said arms;* and that the said Letters Patent should be read with this correction therein that the same may conform to the record of the case in the Patent Office.

Signed and sealed this 26th day of August, A. D., 1919.

[SEAL.]

M. H. COULSTON,

*Acting Commissioner of Patents.*

Cl. 21—105.